United States Patent
Stook et al.

(10) Patent No.: US 7,155,071 B2
(45) Date of Patent: Dec. 26, 2006

(54) DEVICE FOR MACH-ZEHNDER MODULATOR BIAS CONTROL FOR DUOBINARY OPTICAL TRANSMISSION AND ASSOCIATED SYSTEM AND METHOD

(75) Inventors: Christopher R. Stook, Grant, FL (US); Jerry Busby Wood, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 51 days.

(21) Appl. No.: 11/074,532

(22) Filed: Mar. 8, 2005

(65) Prior Publication Data
US 2006/0204162 A1    Sep. 14, 2006

(51) Int. Cl.
G02F 1/035    (2006.01)
H04B 10/04    (2006.01)
H04B 10/12    (2006.01)

(52) U.S. Cl. .......................... 385/2; 398/183; 398/198; 359/239; 359/245

(58) Field of Classification Search ..................... None
See application file for complete search history.

(56) References Cited

U.S. PATENT DOCUMENTS

| | | | |
|---|---|---|---|
| 5,003,624 A | 3/1991 | Terbrack et al. | 455/618 |
| 5,400,417 A | 3/1995 | Allie et al. | 385/2 |
| 5,440,113 A | 8/1995 | Morin et al. | 250/205 |
| 5,495,359 A | 2/1996 | Gertel et al. | 359/245 |
| 5,521,749 A | 5/1996 | Kawashima | 359/325 |
| 5,646,771 A | 7/1997 | Noda | 359/245 |
| 5,812,297 A * | 9/1998 | Mussino et al. | 398/198 |
| 5,892,858 A * | 4/1999 | Vaziri et al. | 385/2 |
| 5,907,426 A | 5/1999 | Kato et al. | 359/239 |
| 5,917,637 A | 6/1999 | Ishikawa et al. | 359/181 |

(Continued)

OTHER PUBLICATIONS

Shankar, "Duobinary Modulation for Optical Systems", Inphi Corporation, pp. 1-10.

(Continued)

*Primary Examiner*—Rodney Bovernick
*Assistant Examiner*—Omar Rojas
(74) *Attorney, Agent, or Firm*—Allen, Dyer, Doppelt, Milbrath & Gilchrist, P.A.

(57) ABSTRACT

An electro-optical device includes an amplifier having an input receiving a data signal, a crossing adjustment input, and an output. The device includes a light source and a Mach-Zehnder modulator having a first input coupled to the output of the amplifier, an optical input coupled to the laser, a bias input, and an optical output. A bias circuit is coupled to the bias input of the Mach-Zehnder modulator and preferably includes a pilot signal generator connected to the crossing adjustment input of the amplifier, and a feedback circuit coupled between the optical output and bias input of the Mach-Zehnder modulator and coupled to the pilot signal generator. The bias circuit applies the pilot signal to the crossing adjust input of the amplifier which forces the modulator to the correct bias point for duobinary transmission. Modulation on +1 and −1 levels is eliminated, and only the 0 level is modulated. The feedback loop forces modulated portion of the waveform to null bias.

15 Claims, 4 Drawing Sheets

U.S. PATENT DOCUMENTS

| | | | | |
|---|---|---|---|---|
| 5,917,638 A * | 6/1999 | Franck et al. | ............... | 398/201 |
| 6,046,838 A | 4/2000 | Kou et al. | .................. | 359/245 |
| 6,097,525 A * | 8/2000 | Ono et al. | .................. | 398/185 |
| 6,388,786 B1 * | 5/2002 | Ono et al. | .................. | 398/183 |
| 6,392,779 B1 * | 5/2002 | Iannelli et al. | .............. | 359/245 |
| 6,445,476 B1 * | 9/2002 | Kahn et al. | ................ | 398/189 |
| 6,473,219 B1 * | 10/2002 | King | ......................... | 359/245 |
| 7,034,977 B1 * | 4/2006 | Harel et al. | ................ | 359/239 |
| 2005/0105917 A1 * | 5/2005 | Narusawa et al. | ......... | 398/183 |
| 2006/0018667 A1 * | 1/2006 | Lee et al. | .................. | 398/186 |

OTHER PUBLICATIONS

Cisco Technology Market., "Optical Technologies for Next-Generation Metro DWDM Applications"; © 2003 Cisco Systems, Inc; pp. 1-30.

Wichers et al., "Optical Duobinary Modulation Schemes Using a Mach-Zehnder Transmitter for Lightwave Systems", © 1999 IEEE, 0-7803-5637-3/99, pp. 15-18.

Kaiser et al., "Reduced Complexity Optical Duobinary 10Gb/s Transmitter Setup Resulting in an Increased Transmission Distance", published at Photonics Technology Letters, Aug. 2001, pp. 1-3.

* cited by examiner

DEVICE FOR MACH-ZEHNDER MODULATOR BIAS CONTROL FOR DUOBINARY OPTICAL TRANSMISSION AND ASSOCIATED SYSTEM AND METHOD

FIELD OF THE INVENTION

The present invention relates to the field of optical communications, and, more particularly, to Mach-Zehnder bias control for duobinary optical transmissions and related methods.

BACKGROUND OF THE INVENTION

Over the course of the past few years the characteristics of Metropolitan Dense Wavelength Division Multiplexing (DWDM) Networks have evolved considerably. Just a few years ago a typical Metro DWDM system had 16×2.5 Gbit/s channels, 200 GHz spacing and un-amplified spans. Nowadays the average system supports 32×10 Gbit/s, 100 GHz spacing, optical amplification and chromatic dispersion compensation to cover distances of over 200 km. The next generation of Metro DWDM systems will raise the bar even further with respect to channel densities and distances, while continuing to reduce the footprint, the power consumption and increasing the flexibility of optical DWDM systems.

In the field of optical communications, Mach-Zehnder optical modulators are used to mix an RF information-bearing signal with a lightwave carrier by electromagnetic phase interferometry. Upon entering the modulator, the lightwave carrier is typically split into two signals that are coupled into separate waveguides formed in the crystal structure of the modulator. Electrodes are placed in close proximity to the waveguides in the device. An RF information-bearing signal is applied to the electrodes next to one of the waveguides. The propagation of the lightwave carrier through the crystal is affected by electric field variations that the RF signal causes. The electric field causes a local change in the refractive indices around the waveguides, thereby speeding up the propagation of the wave in one path while delaying the other. Thus, the relative phase of the two lightwave signals in the modulator is changed in proportion to the modulating signal applied to the electrodes.

At the output of the modulator the divided carrier signals are recombined. When the two signals having variations in relative phase caused by the RF input are recombined, phase interference occurs. Some of the interference is destructive and some constructive. This produces a modulated lightwave output having amplitude changes in proportion to the modulating RF signal. The modulated carrier can be coupled to a fiber optic medium for transmission over considerable distances.

An optical modulator, like its semiconductor counterparts in RF electronics, is a non-linear device. The typical Mach-Zehnder optical modulator comprises a lithium niobate ($LiNbO_3$) crystal device having a non-linear modulation characteristic. To optimize the quality of the modulated output from an electro-optical modulator, it is desirable to apply a bias control to the device to set its operating point, or bias point, as close as possible to the center of its linear range.

Because the principle of operation of the Mach-Zehnder modulator is phase interferometry, the center bias point is very sensitive to temperature, input signal fluctuations, and manufacturing tolerances. Therefore, for good performance, it is desired to continuously monitor the output of the modulator and update the bias to ensure high dynamic range of the optical communications link. Conventional methods of moduator bias control for NRZ modulation do not work well with duobinary modulation.

SUMMARY OF THE INVENTION

In view of the foregoing background, it is therefore an object of the present invention to provide a device and method for improved Mach-Zehnder bias control for duobinary optical transmissions.

This and other objects, features, and advantages in accordance with the present invention are provided by an electro-optical device including an amplifier having an input receiving a data signal (e.g. provided by a precoder), a crossing adjustment input, and an output. The device includes a light source such as a laser, and a Mach-Zehnder modulator having a first input coupled to the output of the amplifier, an optical input coupled to the laser, a bias input, and an optical output. A bias circuit is coupled to the bias input of the Mach-Zehnder modulator and preferably includes a pilot signal generator connected to the crossing adjustment input of the amplifier, and a feedback circuit coupled between the optical output and bias input of the Mach-Zehnder modulator and coupled to the pilot signal generator.

The invention eliminates modulation on the +1 and −1 level as only a 0 level of the data signal is modulated from the pilot signal. The invention reduces complexity and costs of implementing a feedback loop that forces the modulator to the desired null bias point.

The feedback circuit performs a coherent detection of a reference signal present on the optical signal transmitted on the optical output of the Mach-Zehnder modulator, and may include an optical detector coupled to the optical output of the Mach-Zehnder modulator, a mixer having a first input connected to an output of the optical detector, a second input connected to the pilot signal generator, and an output. The feedback circuit may also include an integrator connected between the output of said mixer and the bias input of the Mach-Zehnder modulator. A data rate filter may be connected between the output of the amplifier and the first input of the Mach-Zehnder modulator.

A method aspect of the present invention is directed to controlling the bias of a Mach-Zehnder modulator for duobinary optical transmission. The device includes an amplifier and a bias circuit, the amplifier having an input receiving a data signal, and a crossing adjustment input, the Mach-zehnder modulator receiving an output signal from the amplifier, receiving an optical input from a coherent light source, and receiving a bias signal at a bias input from the bias circuit. The method includes providing the bias circuit with a pilot signal generator connected to the crossing adjustment input of the amplifier, and coupling a feedback circuit between the optical output and bias input of the Mach-Zehnder modulator and also coupled to the pilot signal generator. The method preferably includes modulating only a 0 level of the data signal with the Mach-Zehnder modulator.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

There are many alternative modulation formats, but duobinary appears promising for the next generation of optical transponders. Duobinary signaling exhibits a higher chromatic dispersion (CD) robustness compared to Non Return to Zero (NRZ) and Return to Zero (RZ) formats and is compatible with conventional Avalanche photodiode (APD) or PIN receivers. A duobinary signal is generated by using a single delay stage which creates a three-level signal (0, 1, 2) from the original binary sequence (0, 1). A (−1) offset is then applied to the ternary signal to obtain 0, 1 and −1. A complete duobinary modulator is a little more complex, as the input binary sequence is inverted with a NOT gate and a precoder stage, e.g. including an XOR gate and a feedback tap with one bit delay, so that the optical output matches the electrical data.

Figure 1:
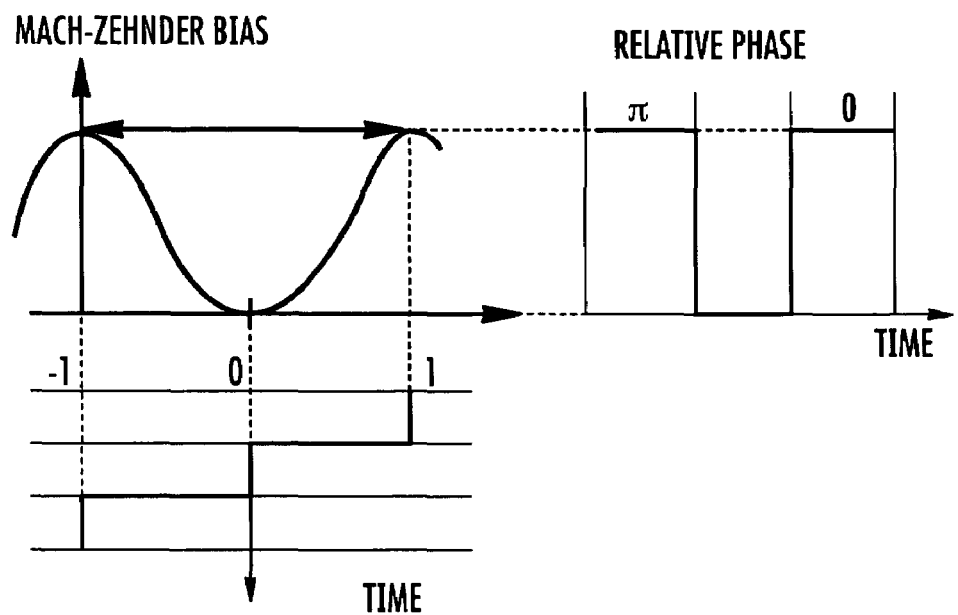
FIG. 1 is a diagram illustrating the transformation of the electrical signal into an optical binary signal as is known in the prior art.

Referring to the diagram of FIG. 1, in the optical domain the three electric levels (0, +1 and −1) translate to only two optical levels (logical 0 and 1). Using the Mach-Zehnder with a three-level driving voltage results in a two-level optical signal, the modulator "off" state corresponds to a zero, while the symbols 1 and −1 are represented by the "on" state with phase 0 and Pi respectively. The ability to operate with conventional photodetectors is one of the major advantages offered by duobinary modulation compared to other advanced modulation schemes. Practical duobinary implementations considerably compress the power spectral density (PSD) compared to an NRZ signal.

Figure 2:
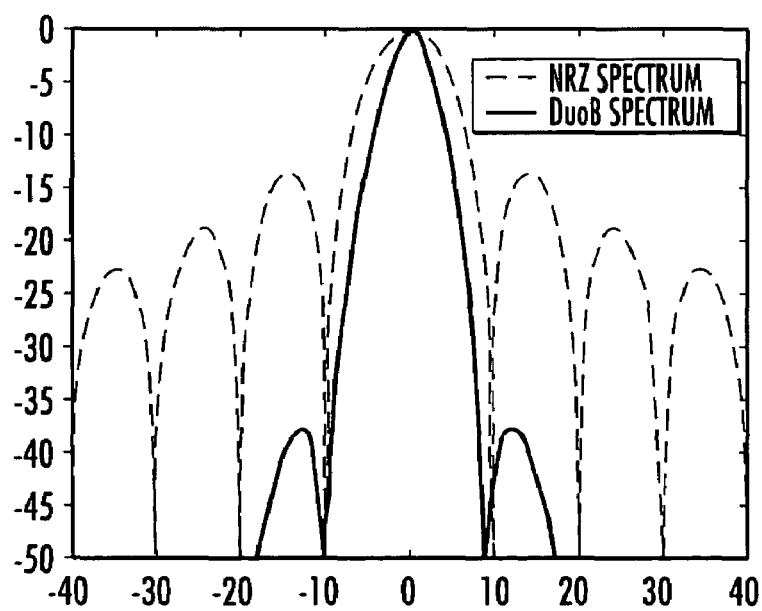
FIG. 2 is a diagram illustrating the power spectral densities of the duobinary signal and the NRZ signal.

With reference to the power spectral density diagram of FIG. 2, the advantages of the duobinary spectrum over NRZ include: as a result of the spectrum compression, a four-fold increase in the CD tolerance compared to a standard NRZ format has been demonstrated (Experimental 10 Gbit/s transmission distances up to 225 km on standard SMF have been reported using duobinary modulation); by reducing the spectral width of the signal it is possible to increase the spectral efficiency (by reducing the channel spacing, or by increasing the modulation bandwidth of the individual channels), without incurring in large penalties associated with the larger NRZ spectrum; and the duobinary spectrum has ideally a null DC component, as the NRZ format has instead a significant amount of power associated with the DC component.

So, duobinary optical transmission can be used to increase the dispersion tolerance of a fiber optic transmitter. This implementation requires a Mach-Zehnder modulator biased near a zero transmission point (for a symmetrical electrical waveform the bias will be exactly at the zero transmission point). System performance is much more sensitive to the bias point than with NRZ modulation. Closed loop control of the bias point is required to compensate for bias drift in the modulator.

Because of required accuracy, the duobinary waveform, and the requirement to be at null bias, conventional bias control methods used for NRZ or analog transmission are not useable for duobinary. Specifically, none of the conventional methods of Mach-Zehnder bias control, including optical power ratio control which minimizes the power out, adding a pilot signal to the RF input of the modulator/recovering the pilot signal at the optical output for closed loop control, or multiplying the RF input to modulator by a pilot signal/recovering the pilot signal at the optical output for closed loop control, were designed for duobinary signals. The methods do not provide the accuracy required, or do not work with duobinary modulation.

Figure 3:
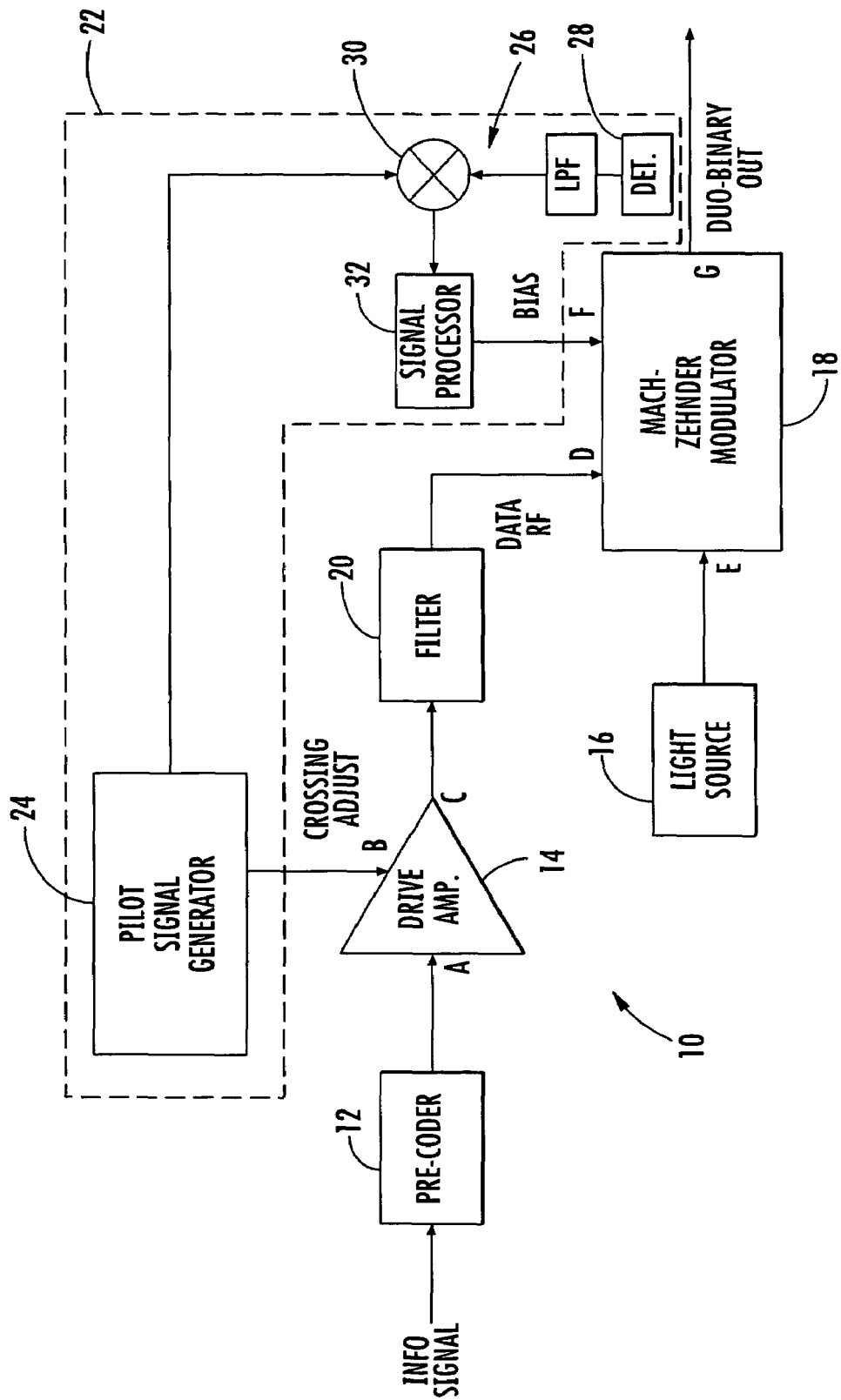
FIG. 3 is a schematic diagram of the electro-optical device of the present invention.
Figure 4:
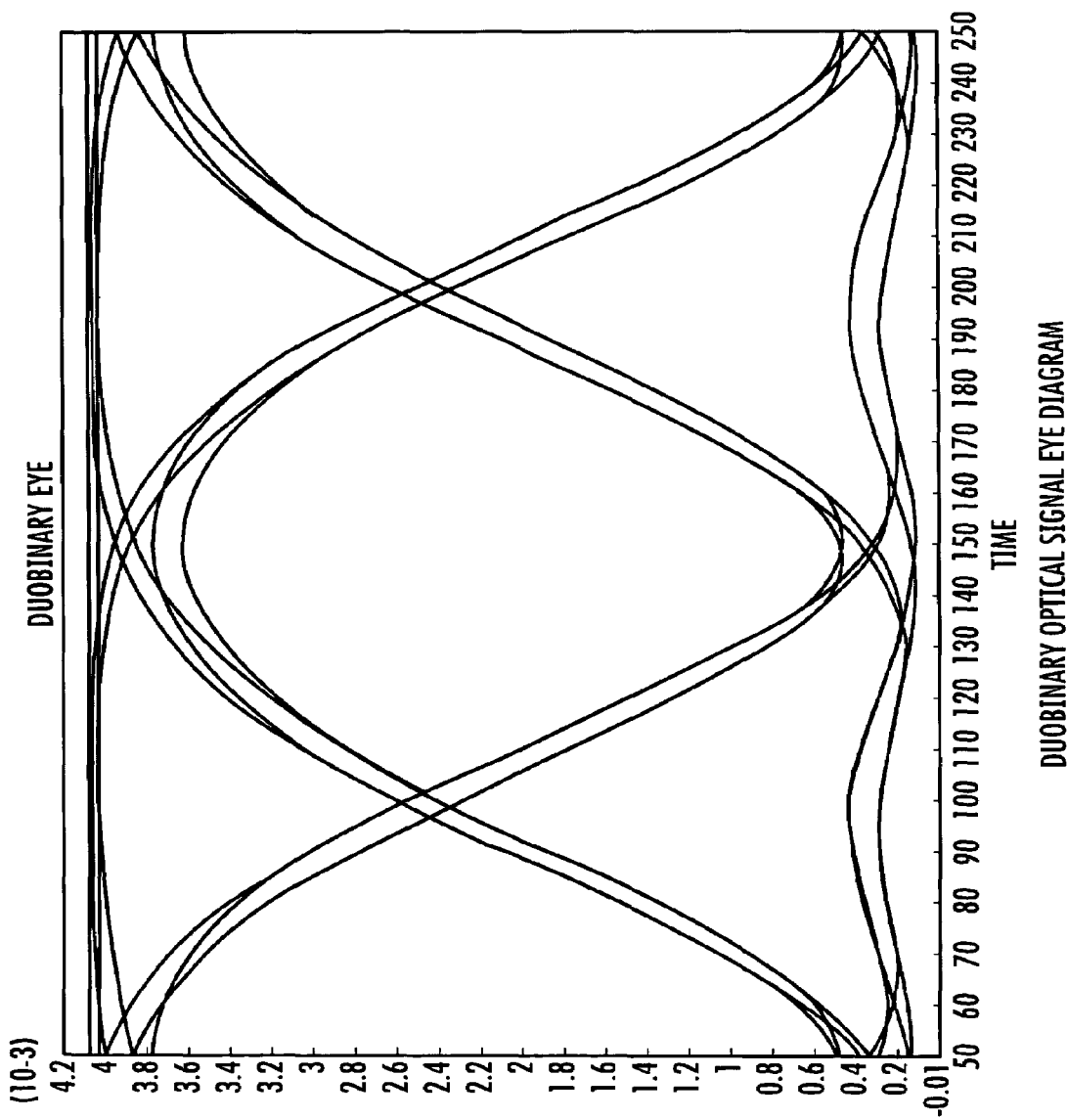
FIG. 4 is a duobinary optical signal eye diagram to illustrate the modulation at the crossing of the duobinary optical signal.

Referring now to FIG. 3, an electro-optical modulator system or device 10 in accordance with the present invention will now be described. The device 10 includes a precoder 12 as part of the signal conditioning required for duobinary transmission. A drive amplifier 14 has an input A receiving the data signal provided by the precoder 12, a crossing adjustment input B, and an output C. The crossing adjustment input B may be a function of several gate voltages in the amplifier design as would be appreciated by those skilled in the art. The device 10 further includes a coherent light source 16 such as a laser, and a Mach-Zehnder modulator 18 having a first input D coupled to the output of the amplifier 14 (e.g. via a ¼ data rate filter 20), an optical input E coupled to the light source 16, a bias input F, and an optical output G.

A bias control circuit 22 is coupled to the bias input F of the Mach-Zehnder modulator 18 and preferably includes a pilot signal generator 24 connected to the crossing adjustment input B of the amplifier 14, and a feedback circuit 26 coupled between the optical output G and the bias input F of the Mach-Zehnder modulator 18 and coupled to the pilot signal generator 24.

The feedback circuit 26 performs a coherent detection of a reference signal present on the duobinary output optical signal transmitted on the optical output G of the Mach-Zehnder modulator 18, and includes an optical detector 28 coupled to the optical output of the Mach-Zehnder modulator, a mixer 30 having a first input connected to an output of the optical detector, a second input connected to the pilot signal generator 24, and an output. Coherent detection means the ability to detect the phase of the reference signal.

The feedback circuit 26 may also include a signal processor 32, for example, including an integrator, connected between the output of the mixer 30 and the bias input F of the Mach-Zehnder modulator 18. As mentioned above, a data rate filter 20 may be connected between the output of the amplifier 14 and the first input of the Mach-Zehnder modulator 18.

With the arrangement of the present invention, only a 0 level of the data signal is modulated. More specifically, the bias control circuit 22 applies the pilot signal to the crossing adjust input of the amplifier 14 which drives the modulator to the correct bias point for duobinary transmission. This eliminates modulation on +1 and −1 levels, as only the 0 level is modulated. Such a control loop forces the modulated portion of the waveform to null bias.

Figure 5:
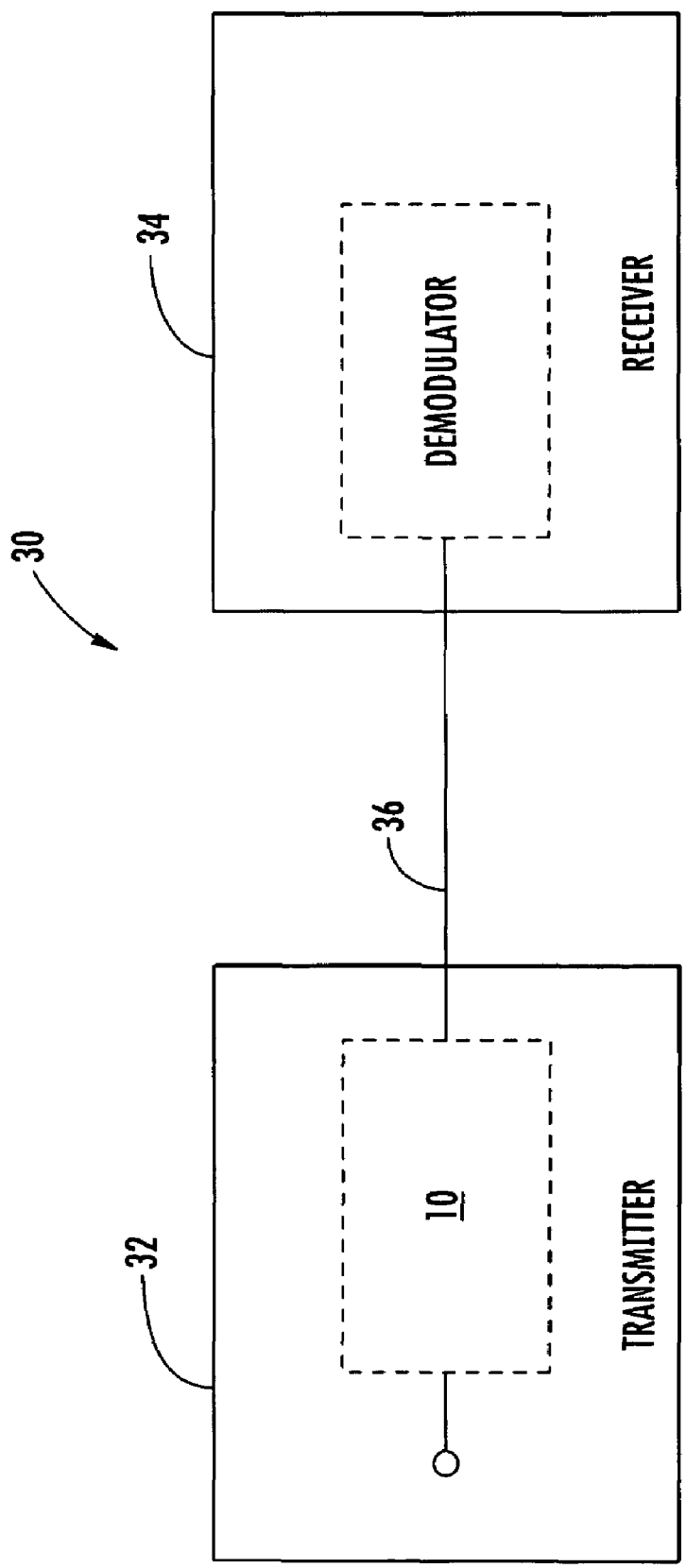
FIG. 5 is a schematic diagram illustrating an optical communications system including the electro-optical device in accordance with the present invention.

Referring to FIG. 5, an optical communication system 30 of the present invention will now be described. The optical communication system 30 includes a transmitting station 32 and a receiving station 34 connected by an optical fiber 36 establishing a communications link therebetween. The transmitting station 32 includes the electro-optical modulator system device 10 as described above. The transmitting station 32 and the electro-optical modulator device 10 generate optical signals based upon the input signal, and transmit the generated optical signals to a first end of the optical fiber 36 transmission path. The optical signals transmitted through the optical fiber 36 are outputted at a second end thereof, and supplied to the optical receiving station 34 which demodulates an output signal with respect to the input signal.

A method aspect of the present invention is directed to controlling the bias of a Mach-Zehnder modulator 18 for duobinary optical transmission. The method includes providing an amplifier 14 having an input A receiving a data signal, a crossing adjustment input B, and an output C. The output of the amplifier 14 is connected to a first input of the Mach-Zehnder modulator 18, and a light source 16, such as a laser, is connected to an optical input of the Mach-Zehnder modulator 18. The bias circuit 22 is connected to the bias input of the Mach-Zehnder modulator 18. As discussed above, the bias circuit 22 preferably includes a pilot signal generator 24 connected to the crossing adjustment input of the amplifier 14, and a feedback circuit 26 coupled between the optical output and bias input of the Mach-Zehnder modulator 18 and coupled to the pilot signal generator 24. The method includes modulating only a 0 level of the data signal with the Mach-Zehnder modulator 18.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electro-optical device comprising:
   a precoder for duobinary transmission conditioning of an information signal to provide a data signal;
   an amplifier having an input receiving the data signal, a crossing adjustment input, and an output;
   a laser;
   a Mach-Zehnder modulator to modulate only a 0 level of the data signal, and having a first input coupled to the output of said amplifier, an optical input coupled to said laser, a bias input, and an optical output to transmit a duobinary optical signal; and
   a bias circuit coupled to the bias input of said Mach-Zehnder modulator and comprising
      a pilot signal generator connected to the crossing adjustment input of said amplifier, and
      a feedback circuit coupled between the optical output and bias input of said Mach-Zehnder modulator and coupled to said pilot signal generator.

2. The electro-optical device according to claim 1 wherein said feedback circuit performs a coherent detection of a reference signal on the duobinary optical signal transmitted on the optical output of said Mach-Zehnder modulator.

3. The electro-optical device according to claim 1 wherein said feedback circuit comprises an optical detector coupled to the optical output of the Mach-Zehnder modulator.

4. The electro-optical device according to claim 3 wherein said feedback circuit further comprises a mixer having a first input connected to an output of said optical detector, a second input connected to the pilot signal generator, and an output.

5. The electro-optical device according to claim 4 wherein said feedback circuit further comprises an integrator connected between the output of said mixer and the bias input of said Mach-Zehnder modulator.

6. The electro-optical device according to claim 1 further comprising a data rate filter between the output of said amplifier and said first input of said Mach-Zehnder modulator.

7. An optical communications system comprising:
   an optical transmitting station;
   an optical receiving station; and
   an optical fiber connecting the optical transmitting station to the optical receiving station;
   the optical transmitting station comprising an electro-optical device including
      a precoder for duobinary transmission conditioning of an information signal to provide a data signal,
      an amplifier having an input receiving a data signal, a crossing adjustment input, and an output,
      a laser,
      a Mach-Zehnder modulator to modulate only a 0 level of the data signal, and having a first input coupled to the output of said amplifier, an optical input coupled to said laser, a bias input, and an optical output to transmit a duobinary optical signal, and
      a bias circuit coupled to the bias input of said Mach-Zehnder modulator and comprising
         a pilot signal generator connected to the crossing adjustment input of said amplifier, and
         a feedback circuit coupled between the optical output and bias input of said Mach-Zehnder modulator and coupled to said pilot signal generator.

8. The system according to claim 7 wherein said feedback circuit performs a coherent detection of a reference signal on the duobinary optical signal transmitted on the optical output of said Mach-Zehnder modulator.

9. The system according to claim 7 wherein said feedback circuit comprises an optical detector coupled to the optical output of the Mach-Zehnder modulator.

10. The system according to claim 9 wherein said feedback circuit further comprises a mixer having a first input connected to an output of said optical detector, a second input connected to the pilot signal generator, and an output.

11. The system according to claim 10 wherein said feedback circuit further comprises an integrator connected between the output of said mixer and the bias input of said Mach-Zehnder modulator.

12. A method for controlling the bias of a Mach-Zehnder modulator device for duobinary optical transmission, the device including a precoder for duobinary transmission conditioning of an information signal to provide a data signal, an amplifier and a bias circuit, the amplifier having an input receiving the data signal, and a crossing adjustment input, the Mach-zehnder modulator receiving an output signal from the amplifier, receiving an optical input from a coherent light source, and receiving a bias signal at a bias input from the bias circuit, the method comprising:

providing the bias circuit with a pilot signal generator connected to the crossing adjustment input of the amplifier;

coupling a feedback circuit between the optical output and bias input of the Mach-Zehnder modulator and also coupled to the pilot signal generator; and modulating only a 0 level of the output signal from the amplifier and transmitting a duobinary optical signal with the Mach-zehnder modulator.

13. The method according to claim 12 wherein said feedback circuit comprises an optical detector coupled to the optical output of the Mach-Zehnder modulator.

14. The method according to claim 13 wherein said feedback circuit further comprises a mixer having a first input connected to an output of said optical detector, a second input connected to the pilot signal generator, and an output.

15. The method according to claim 14 wherein said feedback circuit further comprises an integrator connected between the output of said mixer and the bias input of said Mach-Zehnder modulator.

* * * * *